Patented Aug. 18, 1953

2,649,428

UNITED STATES PATENT OFFICE 2,649,428

MASTIC TILE

Donald W. Moore, Lancaster, and Alonzo H. Searl, Lancaster Township, Lancaster County, Pa., assignors to Armstrong Cork Company, Lancaster, Pa., a corporation of Pennsylvania No Drawing. Application March 23, 1950, Serial No. 151,522

2 Claims. (Cl. 260—33.6)

This invention relates to mastic tile. More particularly, the invention relates to such tiles made from a binder containing resins and plasticizers and any of a number of conventional fillers and pigments.

Mastic tiles have been used as a floor covering for a number of years. Generally speaking, these articles are made by forming a composition containing filler and binder which is prepared by mixing the ingredients in any suitable device. The mix is then passed through rolls to form what is termed a blanket which, in turn, is calendered to obtain a sheet from which the tile is cut. In the lighter shades the binder is generally a resinous material such as coumarone-indene resin, polystyrene, and/or similar tile-forming resins. While these are the most widely used resins in the formation of light-colored tiles, other resins have been employed and for tile-making purposes are considered to be the full equivalent of coumarone-indene, for example. Typical of these other resins are resins obtained by polymerization of unsaturated hydrocarbons, both aliphatic and aromatic, such as mixtures of olefins; diolefins; indene; homologues of styrene, for example, methylstyrene; and condensation products of formaldehyde with hydrocarbons, such as naphthalene formaldehyde condensation product. Such tile-forming resins are all well known in the mastic tile art, and the particular resin utilized forms no part of our present invention.

In order to obtain the desired characteristics of the tile, it is, generally speaking, necessary to plasticize the resin in the preparation of the binder. While any of a number of plasticizers such as pitches and other similar saponifiable materials may be used, in order to obtain resistance to alkali, which enables the use of such tiles on installations below grade, it is generally desirable to utilize nonsaponifiable plasticizers such as mineral oil. Generally speaking, the desired alkali-resistance of the tile can be obtained if the plasticizer consists principally of mineral oil; by this is meant more than about 50% of the plasticizer component of the tile consists of mineral oil. Thus, it is possible in the manufacture of resin tiles to utilize a plasticizer containing, for example, about 51% mineral oil and 49% saponifiable plasticizer such as pitch; although in some instances good alkali resistance may be obtained from systems in which a slight excess of saponifiable plasticizer is used. Aromatic and/or naphthenic base oils may be used. Generally, we prefer to employ oils which are predominantly paraffinic. As saponifiable plasticizers we may employ cottonseed pitch, gelled castor oil, tall oil pitch, stearine pitch, and the like.

There has been for a number of years a severe problem in the light-colored mastic tile industry which is overcome by the practice of our invention as will be more fully described below. This problem is one of curling. It has been found that light-colored resin-bonded tiles, when installed below grade and in other areas which result in exposure of the tile to moisture, after a comparatively short period of time tend to curl, thereby making the installation very unsightly. Curling may even result in breakage or other damage to the tiles on the floor, particularly in areas exposed to heavy traffic. There have been many theories advanced as to the cause of curling, and various modifications in processing during the production of the tile have been tried. Yet, although there has been some reduction in the tendency of such materials to curl after comparatively short periods of service, the problem is still an important one.

We have found that a mastic tile composition containing particular amounts of certain amino compounds can be produced on conventional equipment to produce a curl-resistant floor tile which may be installed below grade or in other areas where moisture is present. In accordance with our invention a conventional mineral oil plasticized resin binder is made and to this binder is added a small amount of the selected amino compound. The resulting material is then compounded and processed on conventional equipment to obtain a mastic tile which is substantially free from any tendency to curl in service.

Before going into detail, while we do not intend to be limited by any theory set forth herein, we believe that the incorporation of the particular quantities of selected amino compound produces the highly desirable result obtained because these materials act as a chemical linking agent between the fillers and binder, thereby resulting in a more dense impervious mass which is highly resistant to the absorption of moisture.

The particular additives used by us in the practice of our invention are advantageously aliphatic amines and salts thereof. These amines are advantageously long chain amines which are obtained from fatty acids. These may vary widely in carbon atom content from at least 6 to 18 and higher and are preferably primary amines but may be secondary or tertiary amines. Typical examples of the aliphatic amines employed in the practice of our invention are hexyl amine, octyl amine, decyl amine, dodecyl amine, tetradecyl amine, hexadecyl amine, octadecyl amine, octadecenyl amine, and octadecadienyl amine. These are typical amines and others of this class may, of course, be employed. Generally speaking, we can obtain particularly advantageous results from the higher molecular weight primary amines such as those containing at least 16 carbon atoms.

It is also within the scope of our invention to compound mixtures of selected amino compounds such as are obtained from mixtures of fatty acids. For example, we can utilize a mixture of normal primary amines containing 3% hexyl amine, 90% octyl amine, and 7% decyl amine. The mixtures contain two or several primary amines in varying quantities. We have obtained particularly advantageous results by utilizing a mixture of normal primary amines containing 30% hexadecyl amine, 25% octadecyl amine, and 45% octadecenyl amine.

While we prefer the primary amines such as those set forth above, it is within the scope of our invention to prepare a composition containing salts of any of the above-mentioned amines. Salts may be prepared by reacting the amine with monovalent inorganic acids such as hydrochloric acid to form the amine hydrochloride or, if desired, by treating the amine with low molecular weight organic acids such as acetic acid to form the corresponding amine acetate. As in the practice of our invention with the amines, salts of mixtures of amines may also be employed in preparing curl-resistant asphalt tile.

In the practice of our invention the selected amino compound may be incorporated in the tile composition in one of several ways. The only limitation is that the quantity of agent used is within the limits of about .02% to about 2% by weight of the composition. We have found that when less than about .02% by weight of the selected amino compound is incorporated in the mass, the resulting product does not show any appreciable improvement in resistance to curling. When more than about 2% by weight of selected amino compound is incorporated in the mix, the desirable characteristics of a floor tile may not be obtained because of the effect on the binder-filler system.

The selected amino compound may be incorporated in the mix by dissolving the amine or salt thereof in the plasticizing oil. The oil is then blended with the resin and fillers in any suitable mixing device. However, if desired, the selected amino compound may be added directly to the combined ingredients of the tile formulation prior to mixing and blending. Following the mixing and blending of the composition the resulting material is milled into a blanket and thereafter calendered into a sheet from which the tiles are cut.

Generally speaking, the proportions of resin, plasticizer, and filler which are commonly used in the production of mastic tiles are as follows. The filler which may be asbestos, limestone, or other mineral filler generally constitutes about 60% to 80% by weight of the tile. Preferably the filler is between about 65% to 75%. Pigments may, of course, be used to produce the desired color effect, and pigments such as titanium oxide, carbon black, iron oxide, ochre, or other suitable pigments may be employed. In compounding a tile composition the pigments, when used, are considered as part of the filler for the purposes of proportioning. The binder portion of the tile generally contains a synthetic resin such as coumarone indene and mineral oil plasticizer or plasticizer consisting principally (more than 50%) of mineral oil. The proportions of plasticizer and resin are, generally speaking, about 50% to 80% resin and 50% to 20% of plasticizer.

In order to more fully understand our invention reference may be had to the following specific examples:

Example I

A tile composition was made by compounding the following ingredients in the following proportions:

| | Parts by weight |
|---|---|
| Coumarone-indene resin having a molecular weight of approximately 600 | 70 |
| Mineral oil of 1400 seconds, Saybolt Universal viscosity at 100° F. and 97° C. aniline point | 30 |
| Filler and pigments | 250 |
| Hexadecyl amine | 0.7 |

The mixture of resin and oil was blended in a steam heated mixing kettle and after a period of time sufficient to effect a proper blending, the filler and pigments were added. To the thus formed mixture, the hexadecyl amine was added, and the resulting batch mixed to obtain a uniform distribution of the binder on the filler and pigment. The mass was then milled to obtain still better distribution and to form a blanket which was then calendered to produce the required surface finish and was then cut into tiles.

Example II

A tile was made utilizing the following ingredients in the following proportions:

| | Parts by weight |
|---|---|
| Coumarone-indene resin having a molecular weight of approximately 600 | 70 |
| Mineral oil of 1400 seconds, Saybolt Universal viscosity at 100° F. and 97° C. aniline point | 30 |
| Filler and pigments | 250 |
| Glacial acetic acid salt of hexadecyl amine | 0.7 |

Example III

A tile composition was made by following the procedure of Example I and utilizing the following ingredients in the following proportions:

| | Parts by weight |
|---|---|
| Filler | 700 |
| Methyl abietate | 75 |
| Polystyrene | 175 |
| Phthalic anhydride diethylene glycol alkyd resin | 25 |
| Mineral oil | 25 |
| Mixture of primary amines containing 30% hexadecyl amine, 25% octadecyl amine, and 45% octadecenyl amine | 2 |

Example IV

A tile composition was made by compounding the following ingredients in the following manner:

| | Parts by weight |
|---|---|
| Filler | 700 |
| Methyl abietate | 100 |
| Polystyrene | 200 |
| Mixture of primary amines containing 30% hexadecyl amine, 25% octadecyl amine, and 45% octadecenyl amine | 2 |

The mixture of resin and methyl abietate plasticizer were blended and after a period of time sufficient to effect proper blending, the filler and pigments were added. To the thus formed mixture was added the mixture of primary amines, and the resulting batch mixed to obtain a uniform distribution of the binder on the filler and pigment. The mix was then milled to obtain still better distribution and to form a blanket which was then calendered to produce the required surface finish. The resulting sheet was then cut into tiles.

*Example V*

A tile composition was prepared by following the procedure of Example I and utilizing the following ingredients in the following proportions:

| | Parts by weight |
|---|---|
| Filler | 700 |
| Methyl abietate | 55 |
| Polystyrene | 157.5 |
| Phthalic anhydride diethylene glycol alkyd resin | 50 |
| Mineral oil | 37.5 |
| Mixture of primary amines containing 30% hexadecyl amine, 25% octadecyl amine, and 45% octadecenyl amine | 2 |

*Example VI*

A tile composition was made by compounding the following ingredients in the following proportions in accordance with the procedure of Example I:

| | Parts by weight |
|---|---|
| Filler | 740 |
| Coumarone-indene resin | 189 |
| Mineral oil | 37 |
| Pitch | 34 |
| Mixture of primary amines containing 30% hexadecyl amine, 25% octadecyl amine, and 45% octadecenyl amine | 5 |

We have used the term "tile-forming resin" to designate those resins which are employed in the binder of our curl-resistant tile. This term is meant to include the resins well known in the tile-making art and which are characterized by the desired hardness and resistance to various materials which enable their use in the production of serviceable tiles. Generally speaking, these resins are of a fairly high molecular weight such as at least about 500 as determined by the Rast method and are obtained from various sources such as coal tar and petroleum. They may be coumarone-indene or blends of coumarone-indene with other resins such as polystyrene. As pointed out hereinabove, the individual resins such as polystyrene or coumarone-indene may be used without blending. All of the resins within this class are well known to the manufacturer of mastic tiles, and those given hereinabove have been given as typical examples of tile-forming resins.

Tiles made in accordance with our invention have been subjected to severe tests under conditions of high moisture absorption and have passed these tests successfully. In addition, the tiles are characterized by good flexibility and resiliency, resistance to penetration, and other properties which are requirements of commercially successful mastic tiles.

We claim:

1. A mastic tile composition comprising about 60% to 80% by weight of a filler and about 40% to 20% by weight of a binder containing coumarone-indene resin, said resin being plasticized with a plasticizer containing mineral oil, said composition containing about .02% to about 2% by weight thereof of at least one primary aliphatic amino compound containing at least 6 carbon atoms selected from the group consisting of amines and salts thereof.

2. A mastic tile composition comprising about 60% to 80% by weight of a filler and about 40% to 20% by weight of a binder containing a tile-forming resin of the group consisting of polystyrene resins, polyindene resins, coumarone-indene resins, and mixtures thereof, said resin being plasticized with a plasticizer containing mineral oil, said composition containing about .02% to about 2% by weight thereof of a mixture of normal primary amines containing about 30% hexadecyl amine, 25% octadecyl amine, and 45% octadecenyl amine.

DONALD W. MOORE.
ALONZO H. SEARL.

References Cited in the file of this patent

UNITED STATES PATENTS

| Number | Name | Date |
|---|---|---|
| 2,390,189 | Soday | Dec. 4, 1945 |
| 2,423,761 | Evans et al. | July 8, 1947 |